June 26, 1951　　　　　F. MICHAELS　　　　2,558,369
TIRE PUMP
Filed Oct. 14, 1947

Inventor
Fred Michaels
By Clarence A. O'Brien
and Harvey B. Jacobson
Attorneys

Patented June 26, 1951

2,558,369

UNITED STATES PATENT OFFICE 2,558,369

TIRE PUMP

Fred Michaels, North Bend, Oreg.

Application October 14, 1947, Serial No. 779,801

1 Claim. (Cl. 230—35)

This invention relates to new and useful improvements in pumps and more particularly to a portable tire pump.

The primary object of the present invention is to provide a tire pump including novel and improved means for retaining said pump in position to a tire that is to be inflated.

Another important object of the present invention is to provide a portable tire pump including novel and improved lever means whereby the operation of the pump will be made easily accessible.

A further object of the present invention is to provide a pump for pneumatic tires that is quite simple and practical in construction.

A still further aim of the present invention is to provide a tire pump that is strong and durable in structure, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
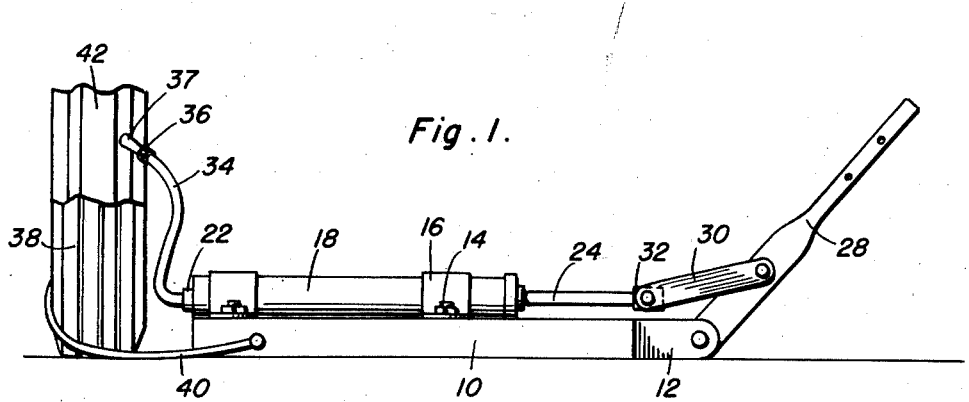
Figure 1 is a side elevational view showing the manner in which the present invention is applied to a pneumatic tire (shown in part)
Figure 2:
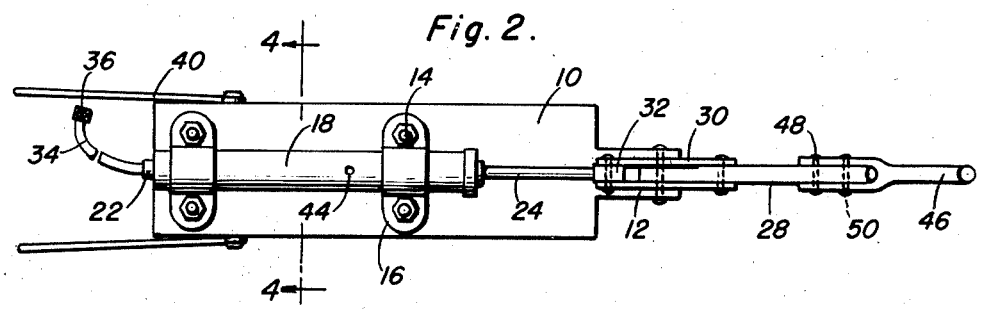
Figure 2 is a plan view of the present tire pump, and with parts broken away and shown in section.
Figure 3:
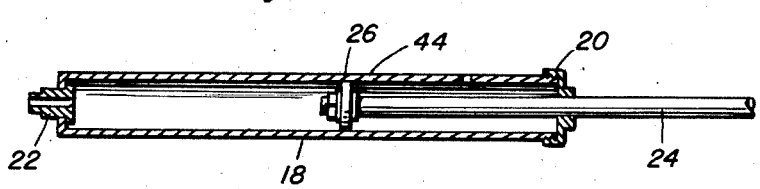
Figure 3 is an enlarged longitudinal vertical sectional view taken substantially through the center of the piston casing, and with parts of the piston rod broken away and shown in section; and, Figure 4 is an enlarged transverse vertical sectional view taken substantially on the plane of section line 4—4 of Figure 2.
Figure 4:
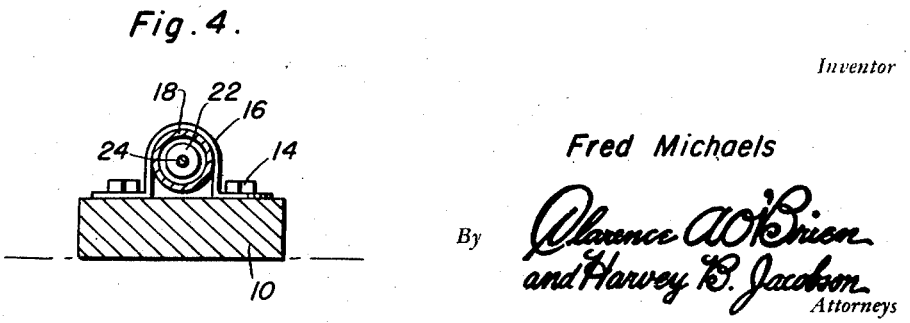

Referring now to the drawings in detail, wherein for the purpose of illustration, there is disclosed a preferred embodiment of the present invention, the numeral 10 represents a substantially rectangular base member of any suitable type of material provided with a pair of outwardly projecting spaced parallel fulcrums 12 at one end, that may be an integral part of the base member or may be fixedly secured thereto by any suitable means.

Removably secured to the upper face of the base member 10 by the use of fasteners 14, is a plurality of substantially U-shaped brackets 16 that frictionally embrace the upper and side peripheries of a cylindrical piston casing 18 provided with a removable closure 20 at one terminal and an outwardly projecting nipple 22 at its opposite terminal.

Mounted for reciprocal movement in the casing 18 and closure 20, is a piston rod 24 supporting a removable piston 26 at one terminal.

Pivotally mounted between the fulcrums 12 is one terminal of a hand receiving lever 28, which is pivotally secured to a pair of links 30 that are in turn pivoted on a block 32 rigidly secured to the outer terminal of the piston rod 24.

Receivably engaging the nipple 22, is an elongated, flexible tubing or hose 34 that is provided with the usual internally threaded swivel coupler ring 36 that engages the externally threaded, flexible air intake nozzle 37 of a pneumatic tire 38.

Also pivotally mounted on opposite sides of the base 10 is a pair of upwardly and forwardly curved hook members or retaining arms having outer terminal hooks 40 that normally extend beneath the tire and frictionally engage the tire rim 42 to prevent movement of the device when in use.

It should be noted that there is provided an air vent 44 intermediate the ends of the casing 18 so that as the handle 28 is actuated upwardly, air will be forced from the casing by the piston and into the tubing 34. Also, for increasing the leverage of the handle 28, there is provided an auxiliary handle 46 bifurcated as at 48 to engage the free terminal of the handle 28. Removable pins 50 are employed for retaining the auxiliary handle in position to handle 28.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention what is claimed as new is:

In combination with a tire pump having a supporting base, a pair of retaining arms carried by the base and having terminal hooks projecting outwardly from one end of the base for embracing a tire and thereby retaining the pump and base relative to a tire.

FRED MICHAELS.

REFERENCES CITED

The following references are of record in the file of this patent:

UNITED STATES PATENTS

| Number | Name | Date |
|---|---|---|
| 98,740 | Carr | Jan. 11, 1870 |
| 1,137,956 | Dowler | May 4, 1915 |
| 1,289,064 | Culp | Dec. 24, 1918 |
| 1,290,129 | Dunn | Jan. 7, 1919 |
| 1,328,232 | Kean | Jan. 13, 1920 |
| 1,532,198 | Nilson et al. | Apr. 7, 1925 |

FOREIGN PATENTS

| Number | Country | Date |
|---|---|---|
| 170,753 | Great Britain | Nov. 3, 1921 |
| 201,387 | Great Britain | Aug. 2, 1923 |
| 537,921 | France | Mar. 11, 1922 |